Feb. 14, 1933.  P. R. ANDREWS  1,897,224
PRESERVING MEANS FOR FISH NETS
Filed Aug. 31, 1931
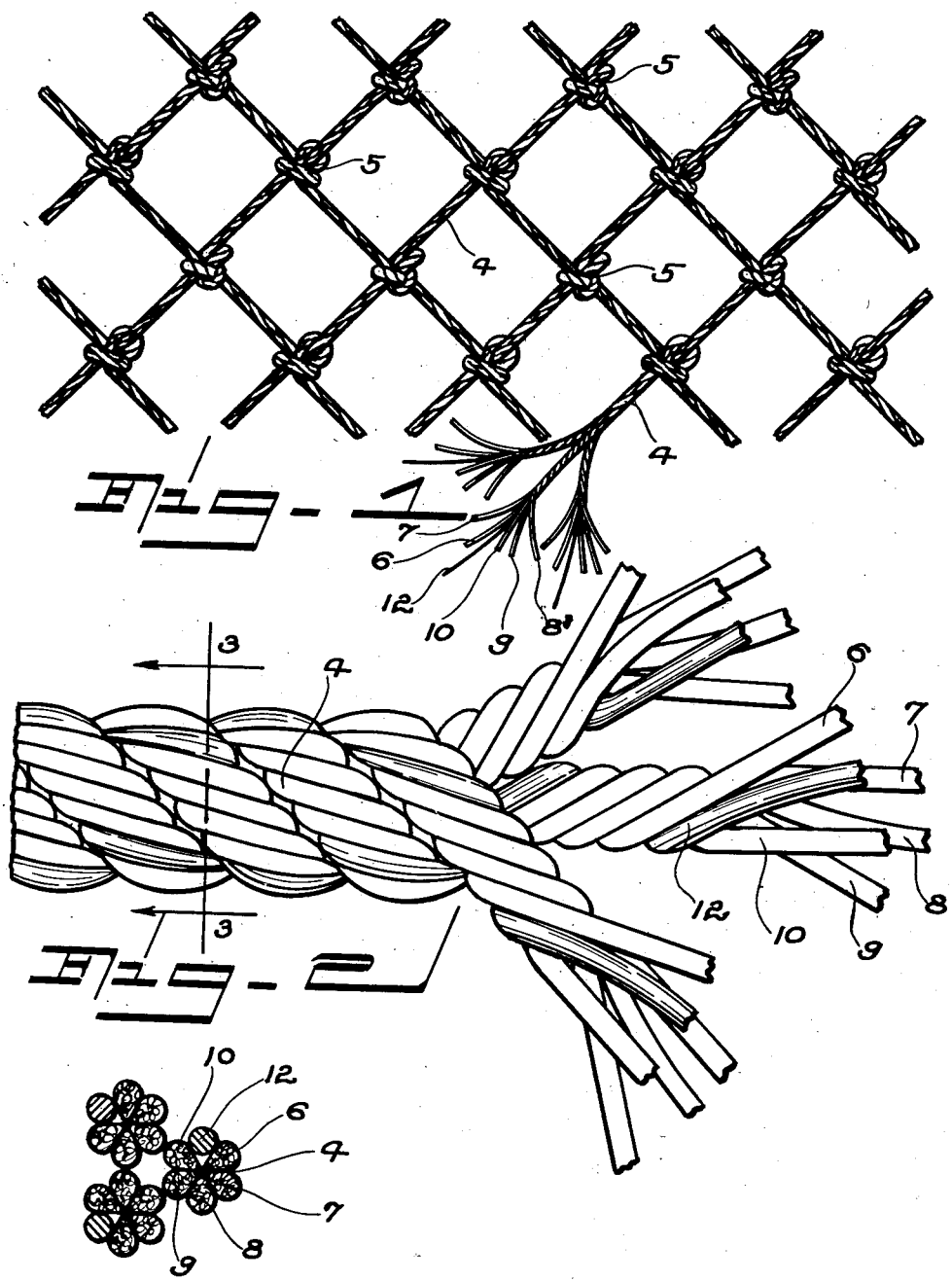
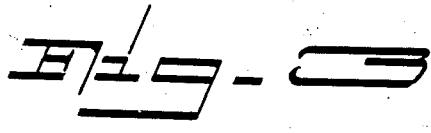

Patented Feb. 14, 1933

1,897,224

UNITED STATES PATENT OFFICE

PHILLIP R. ANDREWS, OF SEATTLE, WASHINGTON

PRESERVING MEANS FOR FISH NETS

Application filed August 31, 1931. Serial No. 560,255.

My present invention relates to the art of fishing equipment and more particularly to preserving means for fish nets.

One of the major problems encountered in fishing industry is the rapid deterioration and decay of nets when immersed and exposed to the actions of sea water. The short life and eventual failure of these nets results from many causes, some chemical, some bacterial and some physical, each augmenting and supplementing the destructive work of the other. Thus, as the progress of deterioration advances with the action of bacteria and chemical rot, the fibers of the net become less able to resist the force of tidal movements, currents and other submarine violence resulting in final rupture and loss of the entire structure.

But perhaps the worst condition arises from the accretion of fungous growths, bacterial slime and the skeletons of marine organisms throughout the meshes of the net until the load becomes sufficiently great to cause complete collapse of the fabric.

Many methods have been employed with more or less success to retard chemical decay and to inhibit the accumulation of these pernicious growths. Tar has been for long used as a protective coating and poisonous salts, (usually copper sulphate), have been introduced into the fibers of the nets by immersion in aqueous solution. Such treatments, however, have not only been costly, tedious and cumbersome, but they have been attended by resultant ill effects sometimes as objectionable as the troubles they essayed to remedy. Tarred nets become gummy and unmanageable, and when not in the water they harden and are often so rendered useless. Furthermore, a rotting action is set up from the tar itself, so that its value is somewhat questionable. Copper salts, on the other hand, although of great benefit in discouraging the marine accumulations are soluble in sea water and soon lose their virtue. To increase the active life of such salts they have been mixed in a greasy vehicle commonly called "copper oleate" and used after dilution, or "cutting" with gasoline as a bath for coating nets. But here again a secondary trouble has ensued from the attempted cure. The oily vehicle invariably causes slipping of the knots resulting in distention of the meshes and escape of fish. This treatment also is laborious and hazardous—the danger of fire from the use of gasoline being always imminent.

The principal object of my invention is the inhibition of marine growths.

A further object is the retardation of saline rot and chemical decay.

A further object is the provision of means which obviate the necessity of dipping or coating of nets with preservative solutions.

A final object is the provision of means which prevent net distortion and add to its ease of manipulation.

Other and more specific objects will be apparent from the following description taken in connection with the accompanying drawing, wherein Figure 1 is a view showing a small section of a woven fiber fish net utilizing my plan of preservation.

Figure 2 is an enlarged fragmentary view showing the arrangement in detail of my preservative agent.

Figure 3 is a cross-sectional view taken along the line 3—3 of Figure 2.

Referring to the drawing, throughout which like reference characters indicate like parts, 4 designates the twine which is woven to form a fish net after the showing of Figure 1. It is normal to arrange the meshes of a fish net approximately in squares as indicated, and the various knots occurring as at 5 are known as weavers knots. This is a knot which under ideal conditions will not slip, however, in the process of manufacture it is not possible to tighten the knots securely as they are made, and consequently if any of the greasy or oily preservatives are used it is quite common for them to slip, thus distorting the mesh and making it unsuitable for the purpose intended.

Fishing nets are normally made of cotton twine, although in some instances linen and hemp are used. In the showing I have represented the type of construction used when cotton twine is used as the base.

In Figure 2 I have illustrated an enlarged view showing the general structure of a single cord or twine. In the present instance I have illustrated what is known to the trade as a 15 thread cotton cord. This is made up of three groups of five threads each, which are twisted together into a single strand somewhat after the fashion of rope making. And each of the three strands are in turn made up of five threads which are twisted together to form a unit or cord. Now, if a larger or smaller sized twine is made it is normal to vary the number of threads occurring in each strand but keeping it at all times three strands to make a single piece of twine.

The most convenient manner in which the poisonous salts of metal may be used on fish nets is to introduce the metal into the twine and then allow the action of sea water to produce the salts as it decomposes the metal. In this manner salts are produced continuously throughout the period the net is in use. I wish it to be understood that there are several methods whereby metal may be introduced into the structure of a fishing net. These consist for instance of immersion in a solution of a copper salt followed by chemical precipitation of chloride particles. Perhaps, however, the method indicated in the drawing is the most efficient method and consists as indicated of weaving a fine metal wire or plurality of wires into the cord before the mesh is made.

I have found it convenient in an introduction of metal into a fish net to use a single strand of metal wire 12 which is twisted into the strand with threads 6, 7, 8, 9 and 10 which go to make up a single strand. In this way when the three strands are twisted together to form the twine the copper wire is well imbedded in the body of the twine. In this connection I wish to bring out very clearly that for different types of marine growths it is sometimes desirable to vary the chemical composition of the wire used. In many instances some of the so called brass wires contain alloys which are very useful when they are decomposed in the presence of the salt water.

The gauge size of such wires and the number of strands employed would of course, vary with the expected life of the twine and also the conditions under which it is to be used.

Since the mere presence of copper and metal alloys in the cord employed in making nets would be sufficient in itself to discourage certain types of organism from clinging to its surface, a definite advantage is at once secured through such retardant property alone. However, though it is only slightly soluble in sea water, and resists chemical attack in such a medium, its ultimate corrosion is productive of a complex series of poisonous salts which are highly destructive to marine growths both plant and animal. Sea water contains about 45 cubic centimeters of carbon dioxide per liter, in the form of carbonates, which in such dilution would be highly ionized. The $CO_2$ radicle is therefore in a state to enter into ready combination with the copper, forming carbonates. These are the greenish salts which are commonly seen on copper when the metal is exposed to the influence of the atmosphere and moisture. Sea water is the most complex substance known, containing traces at least of the compounds of almost every known element. Consequently many other chemical compounds of copper will be formed, saturating the fibers of the cords and so giving to the net a generally poisonous influence. Since, however, some marine organisms are capable of substituting copper for iron in their systems, and since all of the salts formed through its corrosion are not poisonous, the use of this metal is not advocated as a panacea for all the ills that befall nets from sub-marine agencies. But it should prove to have a highly retardant effect against such forces and thus prolong the useful life of the nets.

A net made from such cord would not only include the valuable chemical properties outlined above but it would also have increased tensile strength due to the presence of the wire, so that it would be more resistant to rupture. Furthermore, the knots would not slip, due to the stiffness of the wire and absence of any oily treatment and thereby prevent distortion of the meshes, a common source of trouble from the use of greasy coatings.

The foregoing description and the accompanying drawing are believed to clearly disclose a preferred embodiment of my invention but it will be understood that this disclosure is merely illustrative and that such changes in the invention may be made are fairly within the scope and spirit of the following claim.

What I claim is:

A fish net possessing preservative qualities and fashioned of twine comprising a plurality of intertwined fiber strands, said strands being made up of twisted threads, one of said strands having a wire containing copper and intertwined therein, said wire being exposed at the surface of the twine and subject to corrosive action in salt water to form a chemical compound on the net and prevent accumulation of pernicious marine growths on the net.

In witness whereof, he hereunto subscribes his name this 25th day of August, A. D. 1931.

PHILLIP R. ANDREWS.